United States Patent [19]

Keller et al.

[11] Patent Number: 4,562,354
[45] Date of Patent: Dec. 31, 1985

[54] APPARATUS FOR MEASURING BETA-GAMMA RADIATION EXPOSURE

[75] Inventors: Manfred Keller; Günter Opladen, both of Jülich, Fed. Rep. of Germany

[73] Assignee: Kernforschungsanlage Jülich GmbH, Jülich, Fed. Rep. of Germany

[21] Appl. No.: 515,612

[22] Filed: Jul. 20, 1983

[30] Foreign Application Priority Data

Jul. 21, 1982 [DE] Fed. Rep. of Germany ....... 3227223

[51] Int. Cl.⁴ ............................................. G01T 1/185
[52] U.S. Cl. .................................... 250/388; 250/374
[58] Field of Search ................... 250/374, 370 E, 388, 250/389; 313/93; 378/160

[56] References Cited

U.S. PATENT DOCUMENTS

| | | | |
|---|---|---|---|
| 2,806,147 | 9/1957 | Stellmacher et al. | 250/338 |
| 2,917,647 | 12/1959 | Fowler et al. | 313/93 |
| 3,657,540 | 4/1972 | Maillot | 250/374 |
| 3,898,464 | 8/1975 | Stephan | 250/374 |

FOREIGN PATENT DOCUMENTS 1196304  7/1965  Fed. Rep. of Germany ...... 250/388

OTHER PUBLICATIONS

W. C. Roesch and E. E. Donaldson, "Portable Instruments for Beta-Ray Dosimetry", *Proceedings of the International Conference on the Peaceful Uses of Atomic Energy*, vol. 14, New York, United Nations (Aug. 8-20, 1955, pub. 1956), pp. 172-175.
"Dose Rate Meter DL 1", brochure of Reaktorwartungsdienst und Apparatebau GmbH in Jülich (Jun. 1984).
"New Instruments for Radiation Protection Measurement", brochure of Kernforschungsanlage Jülich GmbH (undated).
H. Heys, "Monitors and Detectors for Radiological Protection", *Electronic Engineering*, vol. 42, No. 513 (Nov. 1970), pp. 80-83.
Dr. Martin Oberhofer, "Health Physics Instrumentation and Measuring Techniques" (German Text), pp. 38-40, Verlag Karlthiemig, Munich.
William J. Price "Nuclear Radiation Detection", pp. 99-101, McGraw-Hill, New York, 2nd ed. 1964.
K. K. Aglintsev et al., "Applied Dosimetry", pp. 137-143, London, Iliffe Books Ltd. (1965).
Niels W. Holm and Roger J. Berry "Manual on Radiation Dosimetry", New York, Marcel Dekker, Inc., 1970, pp. 185-187.
Journal of Scientific Instruments, F. B. Whiting et al., "A Portable Battery-Operated Radiation Monitor", vol. 27, Jun. 1950, pp. 157-160.

*Primary Examiner*—Alfred E. Smith
*Assistant Examiner*—Constantine Hannaher
*Attorney, Agent, or Firm*—Frishauf, Holtz, Goodman & Woodward

[57] ABSTRACT

An ionization chamber of reduced size, with an end window of a diameter preferably smaller than 3 cm is mounted on the end of a hand probe containing an amplifier, the output of which goes through a cable to an indicating device. One of a set of aperture diaphragms may be slipped over the end window to reduce the area of the window transparent to beta rays. In addition to the end window, slots in the cylindrical wall of the chamber increase the solid angle through which radiation may enter the chamber. The end window and the slotted walls of the chamber are covered with tissue-equivalent material for measurement of radiation exposure dose by the electrodes of the chamber and their associated amplifier and indicator. An alternative design with a conical chamber and conical inner electrode and a smaller window provides reliable measurement, even in inhomogeneous radiation fields without the necessity of using diaphragms.

20 Claims, 4 Drawing Figures

APPARATUS FOR MEASURING BETA-GAMMA RADIATION EXPOSURE

This invention concerns apparatus for measuring the dose or dose rate, particularly in inhomogeneous beta-gamma radiation fields, by means of an ionization chamber, a measuring amplifier and an indicating device, the ionization chamber having at least one end window of a material which is a living tissue equivalent for beta and gamma radiation, in particular having a surface weight of 7 mg/cm$^2$. The book "Radiation Protection Practice" by M. Oberhofer (German title "Strahlenschutzpraxis") provides a review of the known measuring apparatus for determining the dose or dose rate in ionizing radiation fields. On pages 43, 44 and 132, measuring devices with ionization chambers are described and shown which are suitable for determination of the aggregate dose of beta and gamma radiation. For measuring the dose components of the beta and gamma rays making up the aggregate dose, the windows of the ionization chamber are covered by tissue-equivalent hoods which are opaque for beta radiation.

In this manner the dose component contributed by gamma radiation is obtained. The beta radiation component is then simply obtained by subtracting the gamma radiation component from the aggregate dose.

The above-described beta-gamma dose rate measuring devices are suitable only for homogeneous radiation fields, such as are produced by large-area contaminated surfaces. Radiation fields are frequently strongly inhomogeneous, for example in the case of small contaminated surfaces and in the case of point radiators. In work procedures that are carried out in such radiation fields, there accordingly arise unexpected radiation overexposures that are locally limited. This has happened because the conception of the measuring devices available on the market up to now was based on homogeneous radiation fields and regarded the problem of inhomogeneous radiation fields as of no significance. These measuring devices, however, can determine locally varying dose ratios only quite inadequately, so that personnel occupied in inhomogeneous radiation fields are more strongly affected than could be gathered from the results of measuring apparatus available up to now.

SUMMARY OF THE INVENTION

It is an object of the present invention to provide a radiation exposure measuring apparatus in such a way that with it even inhomogeneous beta-gamma radiation fields can be measured in small regions of spaced, in the neighborhood of surfaces and with contact, over a large measurement range.

Briefly, the ionization chamber is made comparatively small with an end window diameter about 5 cm and less, preferably only 3 cm at most, and the end window is equipped with a removable aperture diaphragm which has a passage aperture of about 1 cm$^2$ area, and besides is opaque at least for beta rays. For an end window diameter of about 3 cm, the depth of the ionization chamber should lie at about 2 cm.

With this measuring apparatus, it is possible, without using the aperture diaphragm, to measure without difficulty the dose rate of beta-gamma radiation in the neighborhood of a surface or even in contact with the surface in an inhomogeneous radiation field, insofar as the radiation field is basically still homogeneous within the diameter of the end window. This satisfies the requirements of most cases. In order, however, to measure adequately even small surface radiation sources, particularly point sources, the measuring apparatus of the invention has the removable aperture diaphragm. If it is put in place, the beta rays can penetrate into the ionization chamber only through a hole of about 1 cm$^2$ area. The reduction of the measurement sensitivity produced by these features can be taken into calculation by a multiplication factor (diaphragm factor) by which the indicated measurement value is multiplied.

With this measuring apparatus there exists thus the possibility to carry out reliable measurements of the dose rate even in inhomogeneous radiation fields. It is particularly advantageous to be able to cover a broad spectrum of inhomogeneous radiation fields by means of one measuring apparatus. The safety for the persons who work in such radiation fields is correspondingly increased.

In development of the invention, it is provided that the volume of the ionization chamber and the aperture diaphragm are so correlated, that the diaphragm, when used in inhomogeneous radiation fields, produces a measurement change, with reference to the measurement utilizing the full end window diameter, of at least one power of ten. In this manner it is easiest to calculate the actual values of the indicated values. Calibration can then be carried out readily by corresponding experiments.

The ionization chamber should, from a practical standpoint, also have windows with tissue equivalent material on its sides, so that radiation coming in over a spatial angle of 180° will be measured in the ionization chamber. In this manner the precision of the measurement of local dose or local dose power is increased.

The casing for the ionization chamber is preferably made from an aluminum shell which remains open at the front end and has a large number of slots in its sides. The tissue equivalent material should be stretched across the slots as well as over the forward end of the aluminum shell. The stretching over the open end of the aluminum shell can be accomplished by means of a clamping ring.

The invention includes in its scope, as an alternative for the embodiment already described, the provision for the ionization chamber of a casing with an end window of about 1 cm$^2$ area, with an inner electrode in the ionization chamber running towards the end window and having a base diameter that is substantially greater than that of the end window. On the basis of this geometry of the inner electrode, the measurement volume subjected to the incident radiation when the radiation source is approached becomes steadily greater, so that the sensitivity of the ionization chamber is essentially independent of the spacing from the radiation source. The restriction of aperture diameters by diaphragms, with the necessity of multiplying indicated values with a diaphragm factor, is not necessary in the case of this embodiment.

In this embodiment, the inner electrode is made of conical shape. The base diameter can be about five-fold the diameter of the end window. The spacing of the tip of the inner electrode from the end window can, accordingly, be about half of the diameter of the end window.

In the case of both embodiments, the ionization chamber is conveniently disposed at the end of a handle which also contains the amplifier. In this manner a particularly handy apparatus is provided which can be used even in constricted local conditions. The handle and the base of the ionization chamber should have the same external diameter.

Finally, it is expected that the handle would be connected to an indicating device by means of a flexible cable.

THE DRAWINGS

The invention is further described by way of illustrative example with reference to the annexed drawings, in which.

DESCRIPTION OF THE ILLUSTRATED EMBODIMENT

Figure 1:
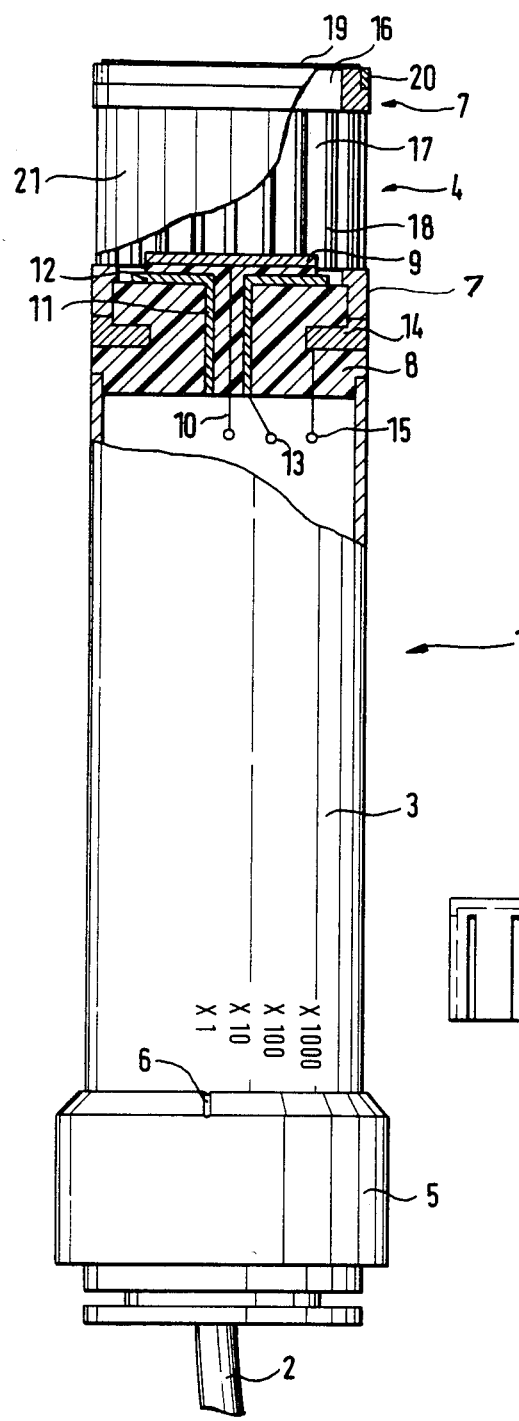
FIG. 1 is a side view, partly in section, of the hand probe of a measuring apparatus for the determination of radiation dose or dose power, including a first ionization chamber embodiment.

The hand probe 1 shown in FIG. 1 is a part of a measuring apparatus for measuring the dose or dose power, especially in inhomogeneous beta and gamma radiation fields. The hand probe 1 is connected by means of a flexible cable 2 with and indicating device not shown here which contains an indicating instrument as well as a power supply.

The hand 1 is cylindrically constituted and consists of an amplifier portion 3 and an ionization chamber 4, filled with air, at the front end of the probe. Both the amplifier portion 3 and the ionization chamber 4 have a a diameter of 3 cm, which is determined by the size of the measurement amplifier disposed in the amplifier portion 3.

At the rear end of the amplifier portion 3, a rotatable ring 5 is mounted by which a range switch can be actuated by rotation for switching from one measurement range to another of the indicating instruments. A notch 6 on the ring 5 designates the value marked on the amplifier portion 3 of the factor by which the reading of the indicating instrument must be multiplied.

The ionization chamber 4 mounted on the front end of the amplifier portion 3 has a chamber casing 7 of aluminum which is screwed onto an insulating body 8. On account of this connection, the ionization chamber 4 can be interchanged readily with differently shaped ionization chambers if that is desired.

The insulating body 8 is made of a synthetic plastic providing a high degree of electrical insulation and in it free electrodes are disposed separated from each other. An inner electrode 9 is applied on the front side of the insulating body 8 and is connected by means of a middle conductor 10 with the measuring amplifier. The middle conductor 10 is surrounded, at a spacing therefrom, by a shield electrode 11 constituted as a shell and having at its front side a collar 12 of the shape of an annular disk. At the rear end, it has a connection 13 by which it receives a potential. The shield electrode 11 is in turn surrounded by an outer electrode 14 in the shape of an annular disk which is in electrically conducting connection to the chamber casing 7, so that a definite potential can be provided to the chamber casing 7 over the connection 15.

Figure 2:
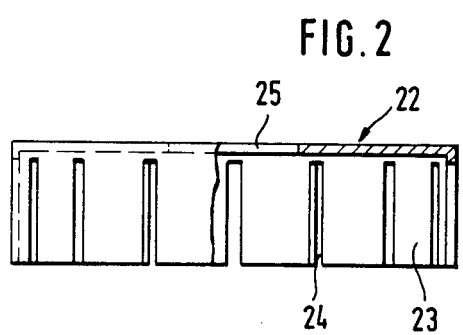
FIG. 2 is a similar side view of an aperture diaphragm for the ionization chamber of FIG. 1.

The chamber casing 7 itself is opened to the front, so that an end window 16 is provided there. In addition, axially running slots 17 are milled into the sidewall of the chamber casing 7 next to each other, so that in this region only thin strips 18 remain. A tissue-equivalent material 19 with a weight per unit area of 7 mg/cm$^2$ is stretched over the end window 16. It is clamped in place externally by a clamp ring 20. The slots 17 are also externally covered by a tissue-equivalent material 21 lying on the strips 18. This material 19,21 consists in both cases of an externally lying insulating foil of synthetic plastic and on the inside of a substantially thinner metallized insulating foil. On account of this construction, beta and gamma rays can penetrate into the ionization chamber 4 from a half space of 180°. Because of the small diameter of the ionization chamber 4, even substantial inhomogeneities in the radiation field are correctly measured. For the case in which the radiation field is inhomogeneous over a distance less than the diameter of the end window 16, an aperture diaphragm 22, such as is shown on a magnified scale in FIG. 2, is slipped over the end window 16 as a cap. In order that it should be seated firmly, incisions 24 are provided in the rim 23 which permit a widening of the rim 23 and thereby a seating with spring pressure.

The aperture diaphragm 22 has a round opening 25 in the center through which beta and gamma rays can penetrate into the ionization chamber. The remaining region of the end window 16, which is covered by the aperture diaphragm 22, is opaque for beta rays. In this manner the beta dose rate of small area sources down to point sources can be adequately measured in the neighborhood of the source. The measurement sensitivity reduced by the diaphragm effect can be corrected by means of a diaphragm factor by which the indicated value of the measurement is to be multiplied. In the illustrated case, the aperture diaphragm 22 and the volume of the ionization chamber 4 are so correlated that the diaphragm factor is exactly 10.

The ionization chamber 4 shown in FIGS. 1 and 2 is distinguished by high sensitivity in comparison to known flat chambers, since the latter have only a minimal volume. The possibility of combination with the aperture diaphragm is of particular advantage, since in this fashion even the smallest inhomogeneities in the radiation field can be measured in a dose-equivalent manner.

Figure 3:
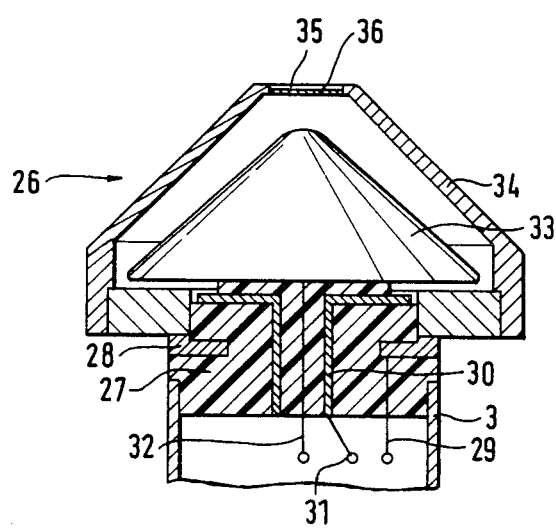
FIG. 3 is a section through a second embodiment of an ionization chamber provided for the amplifier portion of the hand probe of FIG. 1.

The ionization chamber 26 shown in cross-section in FIG. 3 operated without a diaphragm. It is shown screwed onto the front end of the amplifier portion 3 already showh in FIG. 1. The insulting part 27 is similar to the one shown in FIG. 1. Cast into it is an outer electrode 28 with connection 29, a shield electrode 30 with connection 31 and a central conductor 32. These parts correspond to those shown in FIG. 1.

In contrast to the embodiment of FIG. 1, the inner electrode 33 connected to the middle conductor 32 is constituted in cone shape. It is connected with the likewise cone-shaped chamber casing 34 which is in electrically conducting connection with the outer electrode 28 and has merely a small end window 35. The latter is closed off with tissue-equivalent material 36 that corresponds to the material described in connection with FIG. 1. It is accordingly transparent for beta and gamma rays, while the chamber casing 34 is opaque for radiation.

On account of this special geometry, the sensitivity of the ionization chamber 26 is independent of the distance to the radiation source. This is so because the spatial angle going out from a radiation source, and accordingly the radiation passing through the end window 35 are increased with reduced spacing to this source, and likewise also the measurement volume subjected to radiation, with the approach to the radiation source. At larger distance only the tip of the inner electrode 33 will be subjected to beta radiation, whereas with approach of the source, also the rear regions of the inner electrode 33 will be affected.

Figure 4:
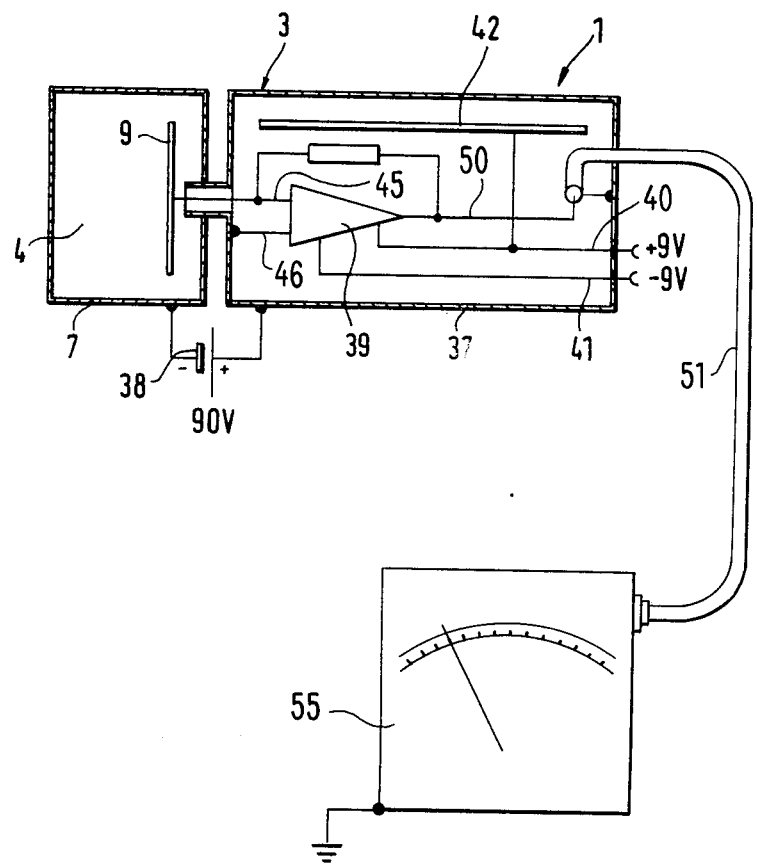
FIG. 4 is a schematic diagram of the circuit of the handprobe of FIG. 1 and its connections to an indicating device.

FIG. 4 shows the hand probe 1 of FIG. 1, this time in a schematic diagram illustrating the electrical constuction. As shown in FIG. 4 the casing 7 of the ionization chamber 4 and the amplifier casing 37 of the amplifier portion 3 are interconnected by an electrical current source 38 in such a way that the chamber casing 7 is at relative negative potential and the amplifier casing 37 at positive potential, the potential difference being 90 volts. This positive potential is applied to the inner electrode 9 of the ionization chamber 4 through the amplifier casing 37 and a measuring amplifier 39 located within the amplifier casing. The measuring amplifier 39 is supplied with an operating voltage of 9 volts through the current supply lines 40 and 41. The amplifier 39 is shown as a differential or operational amplifier having a signal input 45 and a reference voltage input 46, the latter being connected to the casing. The output of the amplifier 39 goes to the inner conductor 50 of a cable 51 leading to an indicating device 55 which may, if desired, include more amplification.

An electron-collecting electrode 42, which may be referred to as a "clean-up" electrode, runs parallel to the longitudinal axis of the amplifier casing 30 and is connected to the current supply line 40 of the amplifier which is at positive potential. This electron-collecting electrode 42 is a wire that because of its relative potential prevents electrons produced by the gamma component of radiation from reaching the input of the measuring amplifier 39. If this electron-collecting electrode 42 were not present, the measuring amplifier 39 would have an over-sensitivity of up to 30% for gamma radiation. This over-sensitivity would result from ionization of the volume of air within the amplifier casing 37 produced by gamma radiation. Since in the construction of the measuring amplifier 39 not all parts which are connected electrically with the input can be fully insulated, short wire ends or parts of soldering terminals act as undesired gathering electrodes for electrons which result from ionization within the amplifier casing 37. The electron-collecting electrode 42 prevents such undesired action.

Although the invention has been described with reference to particular illustrative embodiments, it will be understood that other variations and modifications are possible within the inventive concept.

We claim:

1. Measuring instrument for radiation dosimetry in beta-gamma radiation fields, including dosimetry in inhomogeneous radiation fields, comprising an ionization chamber having a window area at least at one end thereof covered by tissue-equivalent material for beta and gamma radiation, a measuring amplifier and a measurement indicator, and incorporating the improvement wherein said ionization chamber has side walls and has an end window of a diameter not exceeding 5 cm, other dimensions being comparably small, said side walls having apertures therein covered by tissue-equivalent material for beta and gamma radiation, and a removable aperture diaphragm is provided for said end window having an aperture area of about 1 cm$^2$, the remainder of said diaphragm being opaque at least for beta radiation.

2. Measuring instrument according to claim 1, in which the diameter of said end window of said ionization chamber does not exceed 3 cm.

3. Measuring instrument according to claim 2, in which the depth of said ionization chamber measured perpendicular to the plane of said end window is substantially 2 cm.

4. Measuring instrument according to claim 1, in which the volume of said ionization chamber and the aperture of said aperture diaphragm are so related in magnitude that in radiation measurements made in radiation fields which are inhomogeneous, the use of said diaphragm seated on said end window changes the measurement by a factor of an integral power of ten.

5. Measuring instrument according to claim 1, in which the casing of said ionization chamber is constituted as an aluminum sleeve open at its end which forms the front end of said instrument, closed off at its other end by an insulating barrier through which embedded electrical connections pass and having a multiplicity of slots in its side walls.

6. Measuring instrument according to claim 5, in which said tissue-equivalent material is in the nature of a foil stretched both across said front end of said aluminum sleeve casing of said ionization chamber and over said slots in the wall of said aluminum sleeve casing.

7. Measuring instrument according to claim 6, in which a clamping ring is slipped over said open end of said aluminum sleeve for stretching said tissue-equivalent material.

8. Measuring instrument according to claim 1, in which said ionization chamber has a metal sleeve casing of cylindrical form open at one end and fastened detachably at its other end to the end of a portion of said instrument which encloses said amplifier.

9. Measuring instrument according to claim 8 in which within said portion of said instrument which encloses said amplifier (39) an electron collecting electrode (42) is disposed connected to a potential sufficiently positive for collecting electrons produced by the effect of gamma radiation within said amplifier enclosing portion of said instrument.

10. Measuring instrument according to claim 1, in which a portion of said instrument enclosing said amplifier has the shape of a hand-grippable cylinder, and said ionization chamber is located on an end thereof and has a maximum diameter equal to the diameter of said hand-grippable cylinder.

11. Measuring instrument according to claim 10, in which said cylindrical portion enclosing said amplifier is connected by flexible cable with said measurement indicator.

12. Measuring instrument for radiation dosimetry in beta-gamma radiation fields which may be inhomogeneous, comprising, in combination with a measuring amplifier and a measuring indicator:

an ionization chamber having an end window of an area of the order of magnitude of 1 cm$^2$ located at an apex of said chamber towards which the side walls of said chamber taper from a base at the opposite end of said chamber which is of a substantially larger area and adjoins a portion of said instrument which encloses said amplifier, and an inner electrode within said chamber, at least part of which has surfaces disposed parallel to said tapering walls of said chamber.

13. Measuring instrument according to claim 12, in which said tapering walls of said chamber are substantially conical and in which said inner electrode is substantially of conical shape.

14. Measuring instrument according to claim 13, in which said ionization chamber is symmetrical about an axis passing through said end window and perpendicular to said base, and in which the diameter of said base is substantially five times as large as the diameter of said end window.

15. Measuring instrument according to claim 13, in which the diameter of said base of said ionization chamber is approximately five times the magnitude of the diameter of said end window.

16. Measuring instrument according to claim 13, in which the spacing of the apex of said inner electrode from said end window is substantially half of the diameter of said end window.

17. Measuring instrument according to claim 12, in which said portion of said instrument enclosing said amplifier has the shape of a hand-grippable cylinder, and said ionization chamber is located on an end thereof and has a maximum diameter equal to the diameter of said hand-grippable cylinder.

18. Measuring instrument according to claim 17 in which within said portion of said instrument which encloses said amplifier (39) an electron collecting electrode (42) is disposed connected to a potential sufficiently positive for collecting electrons produced by the effect of gamma radiation within said amplifier enclosing portion of said instrument.

19. Measuring apparatus according to claim 12, in which tissue-equivalent material for beta and gamma radiation covers said window and comprises an inwardly located metallized synthetic plastic foil and at least one protective synthetic plastic foil disposed outwards of said metallized plastic foil.

20. Measuring instrument according to claim 19, in which a cylindrical portion of said instrument encloses said amplifier and is connected by flexible cable with said measurement indicator.

* * * * *